US009756593B2

(12) United States Patent
Axmon et al.

(10) Patent No.: US 9,756,593 B2
(45) Date of Patent: Sep. 5, 2017

(54) HANDLING TIMING DIFFERENCES IN TIMING ADVANCE GROUPS IN A COMMUNICATION DEVICE (71) Applicant: Telefonaktiebolaget L M Ericsson (publ), Stockholm (SE)

(72) Inventors: Joakim Axmon, Kävlinge (SE); Muhammad Kazmi, Bromma (SE); Magnus Larsson, Sollentuna (SE); Walter Müller, Upplands Väsby (SE); Mattias Tan Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 14/760,072

(22) PCT Filed: May 8, 2015

(86) PCT No.: PCT/EP2015/060181
§ 371 (c)(1),
(2) Date: Jul. 9, 2015

(87) PCT Pub. No.: WO2015/173137
PCT Pub. Date: Nov. 19, 2015

(65) Prior Publication Data
US 2016/0255601 A1 Sep. 1, 2016

Related U.S. Application Data (60) Provisional application No. 61/991,966, filed on May 12, 2014.

(51) Int. Cl.
H04L 12/28 (2006.01)
H04W 56/00 (2009.01)
(Continued)

(52) U.S. Cl.
CPC ...... H04W 56/0065 (2013.01); H04W 56/0045 (2013.01); H04W 72/0446 (2013.01); H04W 72/121 (2013.01); H04L 5/001 (2013.01)

(58) Field of Classification Search
CPC .......... H04W 56/0065; H04W 72/121; H04W 72/0446; H04W 56/0045; H04L 5/001
See application file for complete search history.

(56) References Cited

U.S. PATENT DOCUMENTS

2013/0195084 A1  8/2013 Chen et al.
2013/0201911 A1  8/2013 Bergström et al.
(Continued)

FOREIGN PATENT DOCUMENTS

EP  2536228 A1  12/2012
EP  2640138 A1  9/2013
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, 1-209.
(Continued)

Primary Examiner — Robert Wilson
(74) Attorney, Agent, or Firm — Murphy, Bilak & Homiller, PLLC (57) ABSTRACT A method of handling TAGs in a UE capable of CA is disclosed. The method comprises monitoring time differences between signals received from any two serving cells and determining for each time difference whether a configured capability of the UE supports the time difference. A wireless telecommunication device and a computer program are also disclosed.

13 Claims, 9 Drawing Sheets (51) Int. Cl.
*H04W 72/04* (2009.01)
*H04W 72/12* (2009.01)
*H04L 5/00* (2006.01)

(56) References Cited

U.S. PATENT DOCUMENTS

| | | | |
|---|---|---|---|
| 2013/0258862 A1 | 10/2013 | Dinan | |
| 2013/0272229 A1 | 10/2013 | Dinan | |
| 2013/0272232 A1* | 10/2013 | Dinan | H04W 52/386 370/329 |
| 2013/0279433 A1* | 10/2013 | Dinan | H04W 56/0005 370/329 |
| 2014/0120920 A1 | 5/2014 | Park et al. | |
| 2014/0161111 A1* | 6/2014 | Kim | H04W 56/0005 370/336 |
| 2015/0304875 A1* | 10/2015 | Axmon | H04W 24/10 370/328 |
| 2015/0327198 A1* | 11/2015 | Axmon | H04W 56/0045 370/336 |
| 2016/0150419 A1* | 5/2016 | Thangarasa | H04W 4/005 370/254 |
| 2016/0249307 A1* | 8/2016 | Thangarasa | H04W 56/001 |
| 2016/0255601 A1* | 9/2016 | Axmon | H04W 56/0045 |

FOREIGN PATENT DOCUMENTS

| | | | |
|---|---|---|---|
| EP | WO 2015/173137 | * | 11/2015 |
| WO | 2008141668 A1 | | 11/2008 |
| WO | 2011121173 A1 | | 10/2011 |
| WO | 2013109531 A1 | | 7/2013 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.1.0, Mar. 2014, 1-209.

3GPP, "3rd Generation Partnership Project; Technical Specification Group Radio Access Network; Evolved Universal Terrestrial Radio Access (E-UTRA); Base Station (BS) radio transmission and reception (Release 11)", 3GPP TS 36.104 V11.4.0, Mar. 2013, 1-134.

3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.3.0, Jun. 2013, 1-57.

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.1.0, Mar. 2014, 1-57.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.4.0, Jun. 2013, 1-346.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-347.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.3.0, Sep. 2014, 1-378.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.3.0, Mar. 2014, 1-25.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.3.0, Mar. 2014, 1-820.

3GPP, "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842 V1.0.0, Nov. 2013, 1-68.

3GPP, "3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0, Dec. 2013, 1-71.

Axmon, Joakim et al., "Handling of Cells Associated with Timing Advance Groups in a Wireless Communications System", Unpublished U.S. Appl. No. 14/593,568, filed Jan. 9, 2015.

* cited by examiner

HANDLING TIMING DIFFERENCES IN TIMING ADVANCE GROUPS IN A COMMUNICATION DEVICE

TECHNICAL FIELD

The present invention generally relates to handling timing differences in Timing Advance Groups in a communication device capable of Carrier Aggregation, such a communication device and a computer program.

ABBREVIATIONS

ACK Acknowledge
A/N ACK/NACK
DL-SCH Downlink shared channel
CA Carrier aggregation
CC Component carrier
CE Control element
CP Cyclic prefix
CQI Channel quality indicator
CRC Cyclic redundancy check
C-RNTI Cell radio network temporary identifier
CSI Channel state information
DCI Downlink control information
DFT Discrete Fourier transform
DL Downlink
EGF Early give-up function
eNB eNodeB
FFT Fast Fourier transform (implementation of DFT)
HARQ Hybrid automatic repeat request
HO handover
IFFT Inverse fast Fourier transform
MAC Medium access control
MIB Master information block
NACK Not acknowledged
NW Network
OFDM Orthogonal frequency division multiplexing
OPP Operating performance point
PBCH Physical broadcast channel
PCell Primary cell
PCFICH Physical control format indicator channel
PDSCH Physical downlink shared channel
PMI Precoding matrix indication
PRACH Physical random access channel
pTAG Primary TAG
PUCCH Physical uplink control channel
RACH Random access channel
RAN Radio access network
RA-RNTI Random access radio network temporary identifier
RB Resource block
RI Rank indication
RLC Radio link control
RLF Radio link failure
RRC Radio resource control
RSIG Reference Signal
SCell Secondary cell
SC-FDMA Single carrier frequency division multiple access
SG Scheduling grant
SR Scheduling request
sTAG Secondary TAG
TA Timing advance
TAG Timing advance group
TC-RNTI Temporary C-RNTI
UCI Uplink control information
UE User equipment
UL Uplink

BACKGROUND

With demands on increased capacity and service in wireless telecommunication networks, solutions are provided to meet that demand. An example is the Long-Term Evolution, LTE, specified by $3^{rd}$ Generation Partnership Project, 3GPP. LTE is a standard for wireless data communications technology and an evolution of the GSM/UMTS standards. The goal of LTE was to increase the capacity and speed of wireless data networks. As a further development, there is provided LTE Advanced which further introduces multicarrier to be able to use ultra wide bandwidth, up to 100 MHz of spectrum supporting very high data rates. The developments discussed above provides for a diversity of UEs present in the network and their features.

SUMMARY

The invention is based on the understanding that the capability of all UEs are not the same regarding how much time difference it can tolerate in sense of a relative propagation delay difference in CA.

The UE has been designed with some capability in mind, e.g. CA supporting 5 carriers 20 MHz each on downlink and two carriers 20 MHz each on uplink. Physical layer processing budgets have been based on this particular capability, guaranteeing enough time for higher layers e.g. from reception until retransmission in case of UL NACK.

The UE always supports at least the minimum requirements in the standard, but may evaluate how much additional time difference it can tolerate whenever it gets reconfigured by the network node. Hence when configured below its capacity with respect to number of carriers on uplink, downlink, or both, or with smaller DL and/or UL aggregation bandwidth than designed for, the UE may tolerate somewhat larger time differences than otherwise supported and designed for.

In case the UE is not configured according to maximum capabilities limited to the minimum requirements, i.e. is configured to handle additional time difference beyond the minimum requirements, there will be spare capacity which can be exploited e.g. by allowing larger difference between TAGs on UL, or larger time difference between aggregated cells on downlink, than stipulated by the minimum requirements in the standard.

The UE may indicate to the network node when a SCell becomes unsuitable for DL CA operation, UL CA operation, or both. The network node can then decide whether to reconfigure the SCell to be used for DL operation only, or whether to release it.

According to a first aspect, there is provided a method of handling TAGs in a UE capable of CA, the method comprising monitoring a time difference between any two serving cells; and determining whether a configured capability of the UE supports the time difference.

According to a second aspect, there is provided a wireless telecommunication device arranged to operate in a wireless telecommunication network supporting CA, wherein the device is capable of CA. The device comprises a time difference circuit arranged to monitor a time difference between any two serving cells; and an evaluator circuit arranged to determine whether a configured capability of the device supports the time difference.

According to a third aspect, there is provided a computer program comprising instructions which, when executed on a processor of a communication apparatus, causes the communication apparatus to perform the method according to the first aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Carrier Aggregation

Figure 1:
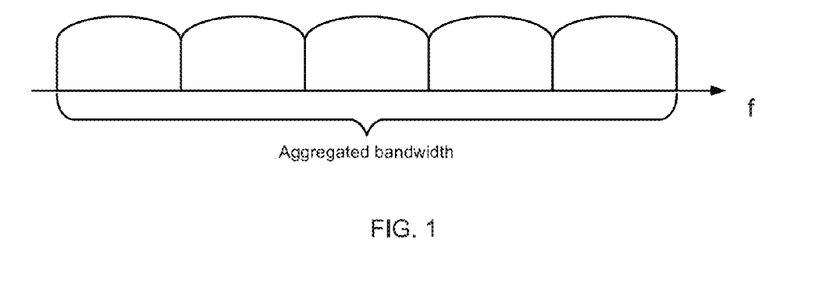
FIG. 1 is a frequency diagram schematically illustrating carrier aggregation.

The LTE Rel-10 specifications have been standardized, supporting Component Carrier (CC) bandwidths up to 20 MHz (which is the maximal LTE Rel-8 carrier bandwidth). An LTE Rel-10 operation wider than 20 MHz is possible and appear as a number of LTE CCs to an LTE Rel-10 terminal. The straightforward way to obtain bandwidths wider than 20 MHz is by means of Carrier Aggregation (CA). CA implies that an LTE Rel-10 terminal can receive multiple CC, where the CC have, or at least the possibility to have, the same structure as a Rel-8 carrier. CA is illustrated in FIG. 1.

The Rel-10 standard supports up to 5 aggregated CCs where each CC is limited in the RF specifications to have one of six bandwidths namely 6, 15, 25, 50, 75 or 100 RB (corresponding to 1.4, 3, 5, 10, 15 and 20 MHz respectively).

The number of aggregated CCs as well as the bandwidth of the individual CCs may be different for uplink and downlink. A symmetric configuration refers to the case where the number of CCs in downlink (DL) and uplink (UL) is the same whereas an asymmetric configuration refers to the case that the number of CCs is different in DL and UL. It is important to note that the number of CCs configured in the network may be different from the number of CCs seen by a terminal: A terminal may for example support more downlink CCs than uplink CCs, even though the network offers the same number of uplink and downlink CCs.

CCs are also referred to as cells or serving cells. More specifically, in an LTE network the cells aggregated by a terminal are denoted primary Serving Cell (PCell) and secondary Serving Cells (SCells). The term serving cell comprises both PCell and SCells. All UEs have one PCell and which cell is a UEs PCell is terminal specific and is considered "more important", i.e. vital control signaling and other important signaling is typically handled via the PCell. Uplink control signaling is always sent on a UEs PCell. The component carrier configured as the PCell is the primary CC whereas all other component carriers are secondary serving cells.

During initial access a LTE Rel-10 terminal behaves similar to a LTE Rel-8 terminal. However, upon successful connection to the network a Rel-10 terminal may—depending on its own capabilities and the network—be configured with additional serving cells in the UL and DL. Configuration is based on RRC. Due to the heavy signaling and rather slow speed of RRC signaling it is envisioned that a terminal may be configured with multiple serving cells even though not all of them are currently used.

SCell Activation and Deactivation

With that the concept of SCells, additional bandwidth resources could be configured/deconfigured dynamically. The configuration/deconfiguration of cells are signaled by the eNB and performed with RRC signaling which is heavy signaling and slow. Since RRC signaling is heavy and slow the concept of activation/deactivation was introduced for SCells. The eNB has the possibility to deactivate a UEs serving cells which the eNB decides which that UE should not use for the moment. Activation/deactivation is performed with MAC signaling which is faster. The activation/deactivation procedure is described in detail in section 5.13 of 3GPP TS 36.321, V12.1.0. Each SCell is configured with a SCellIndex, which is an identifier or so called Cell Index which is unique among all serving cells configured for this UE. The PCell always have Cell Index 0 and SCell can have a integer cell index of 1 to 7.

The Rel-10 Activation/Deactivation MAC CE is defined in section 6.1.3.8 of 3GPP TS 36.321, V12.1.0. The Activation/Deactivation MAC CE consists of a single octet containing seven C-fields and one R-field. Each C-field corresponds to a specific SCellIndex and indicates whether the specific SCell is activated or deactivated. The UE will ignore all C-fields associated with Cell indices not being configured. The Activation/Deactivation MAC CE always indicates the activation status of all configured SCells, meaning that if the eNB wants to activated one SCell it has to include all configured SCells, setting them to activated or deactivated even if they status has not changed.

If a UEs serving cell this activated it would imply that the UE has to monitor PDCCH and PDSCH for that serving cell. This implies a wider receiver bandwidth, higher sampling rates, etc. resulting in high power consumption compared to if that serving cell would have been deactivated.

Timing Alignment of Signals Received at eNode B

In order to preserve the orthogonality in UL the UL transmissions from multiple UEs need to be received time aligned at the eNodeB. This means the transmit timing of the UEs, which are under the control of the same eNB, should be adjusted to ensure that their received signals arrived at the eNB receiver at the same time—more specifically well within the cyclic prefix (CP). This ensures that the eNode B receiver is able to use the same resources (i.e. same DFT or FFT resource) to receive and process the signals from multiple UEs.

Figure 2:
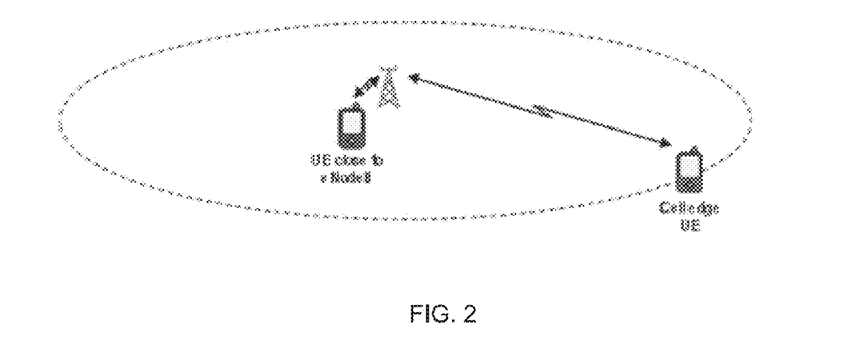
FIG. 2 is a schematic illustration of a cell with two UEs at different distances from an eNodeB.
Figure 3:
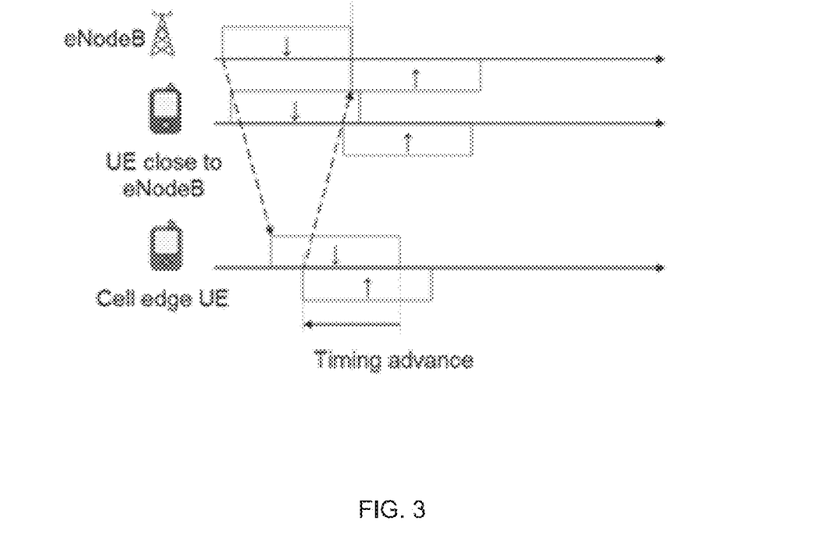
FIG. 3 schematically illustrates timing advance of UL transmissions depending on distance to the eNodeB.

Since UEs may be located at different distances from the eNodeB (see FIG. 2), the UEs will need to initiate their UL transmissions at different times. A UE far from the eNodeB needs to start transmission earlier than a UE close to the eNodeB. This can for example be handled by time advance of the UL transmissions, a UE starts its UL transmission before a nominal time given by a timing reference. This concept is illustrated in FIG. 3.

The UL timing advance is maintained by the eNodeB through timing advance commands transmitted to a UE based on measurements on UL transmissions from that UE. Through timing advance commands, the UE is ordered to start its UL transmissions earlier or later than current UL transmission timing.

There is a strict relation between DL transmissions and the corresponding UL transmission. Examples of this are
- the timing between a DL-SCH transmission on PDSCH to the HARQ ACK/NACK feedback transmitted in UL (either on PUCCH or PUSCH);
- the timing between an UL grant transmission on PDCCH to the UL-SCH transmission on PUSCH.

By increasing the timing advance value for a UE, the UE processing time between the DL transmission and the corresponding UL transmission decreases. For this reason, an upper limit on the maximum timing advance has been defined by 3GPP in order to set a lower limit on the processing time available for a UE. For LTE, this value has been set to roughly 667 us which corresponds to a cell range of roughly 100 km (note that the TA value compensates for the round trip delay).

In LTE Rel-10 there is only a single timing advance (TA) value per UE and all UL cells are assumed to have the same transmission timing. The timing reference point for the TA is the receive timing of the primary DL cell.

In LTE Rel-11 support for multiple TA values was introduced and one UE may have different TA values for different cells. One reason for the introduction of multiple TA values is that a UE should support UL transmission to multiple UL reception points. As in general a UE have different round trip delay to different physical nodes the UE will, in general, need different TA values to these different physical nodes. A UE might also need different TA values for UL transmissions to cells in different bands. The current assumption in 3GPP is that the serving cells of a UE which the eNB considers suit to use the same TA value will be grouped together in a so called TA group (TAG). TA grouping will be signalled by the NW by RRC signalling. TA grouping can be done for example depending on deployment where UL serving cells terminated at the same physical node will be grouped in to the same TA group.

Serving cells in the same TA group will share TA value and the DL of one serving cell in the TA group will be used as timing reference. To each TA value there is an associated timer called TA timer. The UE considers the serving cell in a TA group in-synch, i.e. time aligned, when the TA timer associated with that TA groups TA value is running. If by the UE a serving cell is considered time aligned the UE is allowed to perform PUCCH, PUSCH and SRS transmissions on that serving cell. A TA timer is started or restarted upon reception of a TA command addressed to the associated TA group. TA commands are discussed further below.

Random Access

Figure 4:
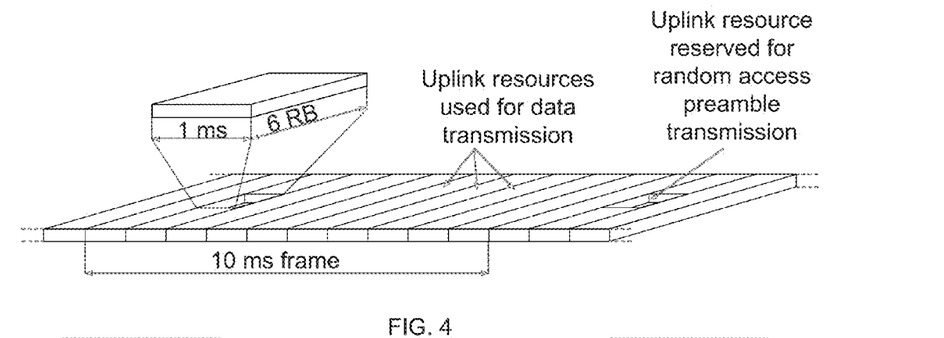
FIG. 4 schematically illustrates random-access-preamble transmission.

In LTE, as in any communication system, a mobile terminal may need to contact the network (via the eNodeB) without having a dedicated resource in the Uplink (from UE to base station). To handle this, a random access procedure is available where a UE that does not have a dedicated UL resource may transmit a signal to the base station. The first message (MSG1 or preamble) of this procedure is typically transmitted on a special resource reserved for random access, a physical random access channel (PRACH). This channel can for instance be limited in time and/or frequency (as in LTE). See FIG. 4 below. The resources available for PRACH transmission is provided to the terminals as part of the broadcasted system information (or as part of dedicated RRC signaling in case of e.g. handover).

Figure 5:
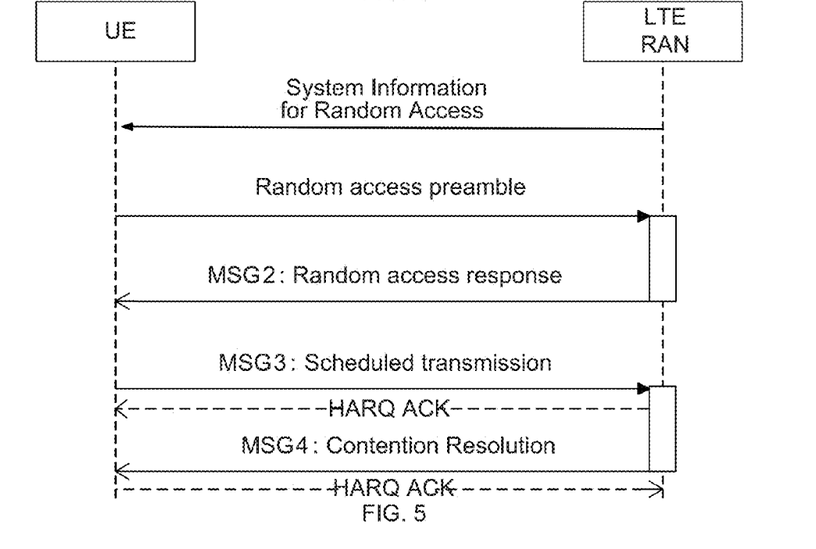
FIG. 5 is a signalling scheme illustrating signalling over the air interface for contention-based random access procedure in LTE.

In LTE, the random access procedure can be used for a number of different reasons. Among these reasons are
- Initial access (for UEs in the LTE_IDLE or LTE_DETACHED states)
- Incoming handover
- Resynchronization of the UL
- Scheduling request (for a UE that is not allocated any other resource for contacting the base station)
- Positioning The contention-based random access procedure used in LTE is illustrated in FIG. 5 below. The UE starts the random access procedure by randomly selecting one of the preambles available for contention-based random access. The UE then transmits the selected random access preamble on the physical random access channel (PRACH) to eNode B in RAN.

The RAN acknowledges any preamble it detects by transmitting a random access response (MSG2) including an initial grant to be used on the uplink shared channel, a temporary C-RNTI, and a time alignment (TA) update based on the timing offset of the preamble measured by the eNodeB on the PRACH. The MSG2 is transmitted in the DL to the UE and its corresponding PDCCH message CRC is scrambled with the RA-RNTI.

When receiving the random access response (MSG2) the UE uses the grant to transmit a message (MSG3) that in part is used to trigger the establishment of radio resource control and in part to uniquely identify the UE on the common channels of the cell. The timing advance command provided in the random access response is applied in the UL transmission in MSG3. The eNodeB can change the resources blocks that are assigned for a MSG3 transmission by sending an UL grant that's CRC is scrambled with the TC-RNTI.

The MSG4 which is then contention resolution has its PDCCH CRC scrambled with the C-RNTI if the UE previously has a C-RNTI assigned. If the UE does not have a C-RNTI previously assigned has its PDCCH CRC is scrambled with the TC-RNTI.

Figure 6:
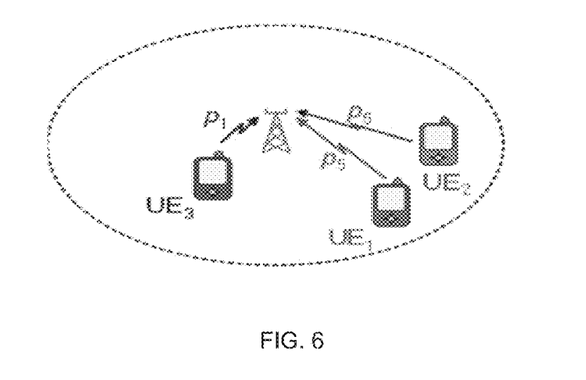
FIG. 6 is an illustration of contention-based random access, where there is contention between two UEs.

The procedure ends with RAN solving any preamble contention that may have occurred for the case that multiple UEs transmitted the same preamble at the same time. This can occur since each UE randomly selects when to transmit and which preamble to use. If multiple UEs select the same preamble for the transmission on RACH, there will be contention between these UEs that needs to be resolved through the contention resolution message (MSG4). The case when contention occurs is illustrated in FIG. 6, where two UEs transmit the same preamble, p5, at the same time. A third UE also transmits at the same RACH, but since it transmits with a different preamble, p1, there is no contention between this UE and the other two UEs.

The UE can also perform non-contention based random access. A non-contention based random access or contention free random access can e.g. be initiated by the eNodeB to get the UE to achieve synchronisation in UL. The eNodeB initiates a non-contention based random access either by sending a PDCCH order or indicating it in an RRC message. The later of the two is used in case of HO.

In LTE in Rel-10 the random access procedure is limited to the primary cell only. This implies that the UE can only send a preamble on the primary cell. Further MSG2 and MSG3 is only received and transmitted on the primary cell. MSG4 can however in Rel-10 be transmitted on any DL cell.

In LTE Rel-11, the current assumption is that the random access procedure will be supported also on secondary cells, at least for the UEs supporting Rel-11 carrier aggregation. So far only network initiated random access on SCells is assumed.

Initial TAC and Subsequent TAC

TA values are used by the UE to offset the UL transmission timing relative a reference. The current assumption in 3GPP is that the DL reception timing of a serving cell is used as timing reference and the UL transmission timing will be offsetted relative to the DL reception timing of that, so called, timing reference cell. At preamble transmission the UE uses a TA value of zero and the preamble will therefore be transmitted at the time of DL reception of the timing reference cell. When the eNB receives the preamble it measures the time misalignment of wanted UL reception timing on the cell on which the preamble was transmitted and the actual UL timing of the preamble. Based on this measured misalignment the eNB creates an initial TA command which is sent to the UE in the random access response message (MSG2). When the UE receives this TA command it will apply the indicated TA value to the TA group which the cell which performed the preamble transmission. The TA value tells the UE how much to advance the UL transmission in subsequent UL transmissions on the cells belonging to that TA group.

Because a UE can move and the round trip time to the UL reception points can change and the TA values might then become inaccurate. Therefore, when receiving UL transmissions from a UE on a cell the eNodeB measures the time misalignment of the UL signals from that UE on that cell. If measured time misalignment of the UL signals from that UE on a cell is by the eNodeB judged to be too large, the eNodeB can create a TA command message containing a delta update to the TA value used by that UE. The UE will, when receiving such a TA command, increase or decrease the TA value according to the delta update.

The initial TA command is an 11 bit long value and is send in the random access response message. An initial TA command tells the UE how much the addressed TA value should be advanced. The addressed TA value is the TA value which is associated with the TA group to which the cell where the preamble was sent, or put in other words. If a UE perform random access on a cell belonging to a TA group x then the TA value associated with TA group x is the addressed TA value. Subsequent TA commands are 6 bit long values and are sent in TA command MAC Control Elements (CEs) which aside from the TA command itself also contains a TA group identity and the TA value associated with the identified TA group is the addressed TA value. A TA command tells the UE how much the TA value should be advanced.

It has recently been agreed in 3GPP that for the serving cells in the same TA group as the PCell the DL reception timing of the PCell should be the timing reference. For serving cells in a TA group not containing the PCell the DL reception timing of a serving cell selected by the UE should be used as timing reference.

When receiving a TA command, initial or subsequent, the UE will apply the TA command and start the associated TA timer. The UE will consider the serving cells belonging to a TA group as UL in-synch, i.e. UL time aligned, as long as the associated TA timer is running. When the UE is considering a cell UL time aligned normal UL transmissions are allowed while when a cell is not consider UL time alignment only PRACH transmissions are allowed.

Autonomous Uplink Timing Adjustment

In addition to the TA based adjustment of the UL transmit timing, there is also pre-defined requirement on the UE to autonomously adjust its UL timing in response to the drift in the eNode B transmit timing. More specifically the UE is required to follow the change in the frame transmit timing of the serving cell and correspondingly adjust its transmit timing for each transmission. The UE typically uses some sort of reference signals to track the downlink timing of the serving cell e.g. common reference signal, synchronization signals etc.

The serving cell timing may change due to different reasons e.g. due to variation in radio conditions, imperfection in clocks, maintenance activities, deliberate attempt by the network to change timing etc. In addition it is also required that the UE changes its timing (increase or decrease) with certain rate. This is to make sure that the UE does not change the timing too fast. This requirement stems from the fact that if the UE changes its timing in the order of several μs from subframe to subframe, the base station receiver may not be able to cope with the received signals. This will result in degradation of demodulation of signals transmitted by the UE.

Maximum Time Difference Supported

The current 3GPP LTE specification, TS 36.300 Annex J, states that a UE should cope with a relative propagation delay difference up to 30 μs among the component carriers to be aggregated in inter-band non-contiguous CA. This requirement is pertaining to the downlink. The UE is also required to support certain maximum UL transmission time difference between signals transmitted on its UL PCell and UL SCell; this is approximately 32.5 μs. This is also called as the transmission timing difference between TAGs (e.g. between pTAG and sTAG or between any two sTAGs).

Radio Link Failure

Radio link failure is a procedure defined in LTE which makes the UE consider the current radio link not usable anymore and therefore tries to reestablish the connection to the network. Radio Link Failure is triggered by the following events: Poor radio quality: The UE will monitor the radio quality of the link and if the quality falls is below a threshold for a certain time the terminal will trigger RLF.

Random Access Failure: If too many unsuccessful random access procedure attempts have been done the terminal will trigger RLF.

RLF retransmissions: In the Radio Link Control (RLC) layer the terminal will count the number of retransmissions, and if this exceeds a certain thresholds the terminal will trigger RLF.

When RLF is triggered the terminal will try to, among other things, reestablish its connection to the network by sending an RRC Connection Re-Establishment.

Event-Triggered Reporting

For the purpose of mobility measurements the UE can get configured with events, which when triggered, render some action from the UE, e.g. that it shall report measured signal strength and signal interference values for detected cells. Existing events in E-UTRA are listed below (3GPP TS 36.331, V12.1.0):

Event A1 (Serving becomes better than threshold)
Event A2 (Serving becomes worse than threshold)
Event A3 (Neighbor becomes offset better than PCell)
Event A4 (Neighbor becomes better than threshold)
Event A5 (PCell becomes worse than threshold1 and neighbor becomes better than threshold2)
Event A6 (Neighbor becomes offset better than SCell)
Event B1 (Inter RAT neighbor becomes better than threshold)
Event B2 (PCell becomes worse than threshold1 and inter RAT neighbor becomes better than threshold2)

Definitions

The PCell and one or more activated SCells that the UE has been configured to use for DL CA operation and for which the UE is receiving and decoding, is herein referred to as belonging to the DL aggregation set. The DL aggregation set may or may not contain all activated SCells. Reasons for the UE to exclude a SCell from the DL aggregation set includes when the time dispersion between the cells used for aggregation becomes too large for the UE to handle. The minimum requirements state that the UE shall be capable of handling time dispersion of 30.26 us between the earliest and latest arriving cells with respect to frame timing.

The PCell and one or more activated SCells that the UE has been configured to use for UL CA operation and for which the UE is monitoring scheduling grants and subsequently transmitting in are herein referred to as belonging to the UL aggregation set. The UL aggregation set may or may not include all such activated SCells configured for UL operation. Reasons for excluding an SCell may be that it belongs to a TAG for which the time difference to the PCell exceeds what the UE can handle. As stated in the technical background above it can be derived that as minimum requirement the UE has to support about 32.5 µs.

LTE Physical Layer Downlink and Uplink Processing

Figure 7:
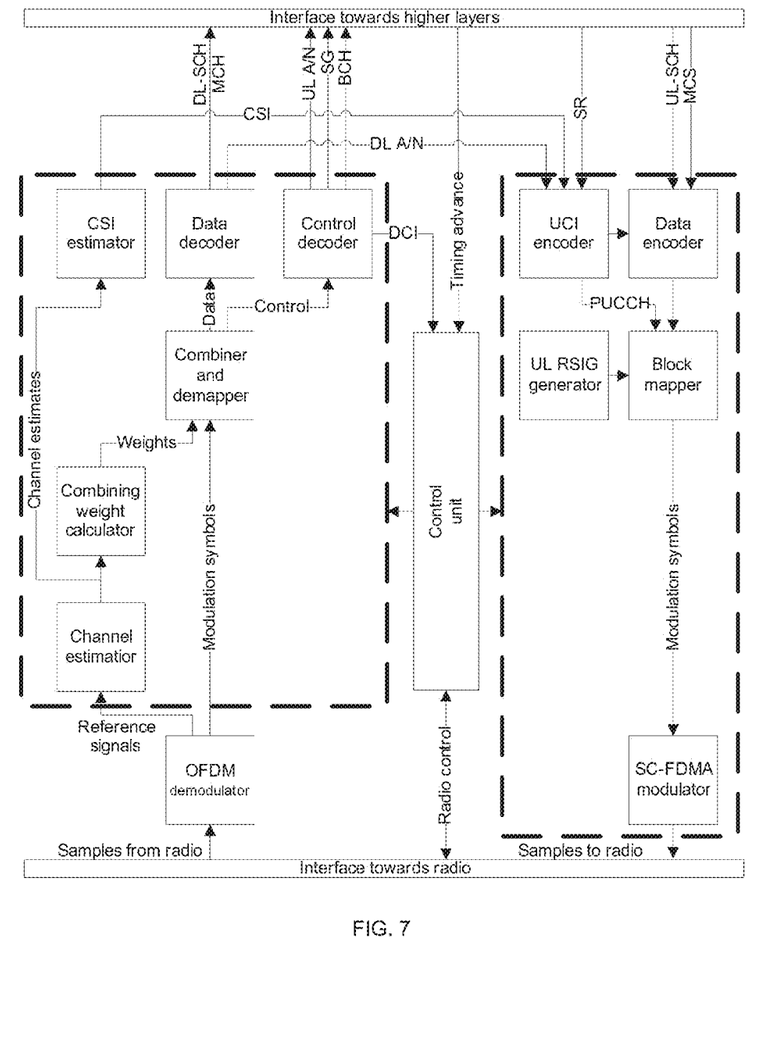
FIG. 7 schematically illustrates LTE physical layer DL and UL processing for a UE.

A simplified sketch of the LTE physical layer in a UE is provided in FIG. 7. Samples are received from the radio, and subjected to an FFT in the OFDM demodulator. The output comprises resource elements carrying e.g. modulation symbols and reference signals. The reference signal are used by the Channel estimator for estimating the radio channel, and from the channel estimates and information on transmission mode and allocated bandwidth the optimum combining weights are derived by the Combining weight calculator. Some reference signals are also used by the CSI estimator for calculating channel state information (CSI) which is fed back to the network node. Received modulation symbols and combining weights are fed to the Combiner and demapper which produces soft bits, which further are input to either of the decoders, depending on channel.

The UE first receives and decoded PDCCH (physical downlink control channel) to find downlink control information (DCI) providing information on allocations on PDSCH (physical downlink shared channel) as well as the transmission mode and modulation and coding scheme (MCS) in use, uplink allocations (scheduling grant; SG), uplink power control commands, etc. However before receiving it the UE decodes the physical control format indicator channel (PCFICH) which tells how large the control region is, i.e., how many of the initial OFDM symbols in the subframe are carrying PDCCH. Also, before the decoding the radio propagation channel needs to be estimated and combining weights be produced.

PDCCH is convolutional encoded and is decoded by the Control decoder. The decoded DCI is fed to the Control unit which is used for configuring the baseband. The Control decoder further outputs feedback from the network node on whether transmissions on the uplink were successfully decoded or not (UL ACK/NACK; UL A/N), and is also used for decoding the master information block (MIB) carried on PBCH (physical broadcast channel).

Once the DCI has been decoded, generally at a point in time about in the middle of the subframe, the PDSCH is next. Remaining reference signals in the subframe are used for improving the channel estimates, combining weights are tailored for the transmission mode in use, and then the received modulation symbols are combined and demapped, resulting in soft bits to be subjected to decoding. Since the whole subframe has to be received before the decoding can start, timing-wise this happens in the following subframe, in a pipelined fashion, while control information is received and decoded.

PDSCH is turbo encoded and it is decoded using the Data decoder which mainly comprises hybrid automatic request (HARM) functionality with associated soft bit combiner, and a turbo decoder. The turbo decoder iterates the decoding until the received data is successfully decoded (as indicated by a successful cyclic redundancy check; CRC) or until running out of time (iterations). In case of failure to decode it may give up earlier if metrics indicate that not much more information is corrected in subsequent iterations, so called early give-up function (EGF). Due to the pipelined fashion of processing the turbo decoder has to finish within the duration of one subframe. Feedback on whether data was successfully decoded or not (ACK/NACK; DL A/N) is provided to the network node in subframe n+4, where subframe n is the subframe where the data was received.

The CSI reporting may be either periodical, by which the UE knows beforehand when it is to be reported, but may also be aperiodical by which the UE gets informed in the DCI that a CSI report is to be sent in subframe n+4.

The processing time for the OFDM demodulator, Channel Estimator, Combining weight calculator, Combiner and demapper, and Control decoder is highly dependent on the bandwidth in use, whereas the processing time for the Data decoder mainly depends on the UE category which is dictating the size of the HARQ buffers.

When the UE has received an SG in subframe n, it is to transmit on the physical uplink shared channel (PUSCH) in subframe n+4. Scheduling requests (SR), DL A/N, and CSI constitute the uplink control information (UCI) which is encoded by the UCI encoder. Data to be transmitted is encoded by the Data encoder which carriers out Turbo encoding, and then UCI is inserted. The modulation symbols are fed to the Block mapper, which maps the modulation symbols and uplink reference symbols, produced by UL RSIG generator, to the granted allocation. The resulting sequences of symbols are fed to the SC-FDMA modulator which essentially carries out an IFFT, and the output is sent to the radio.

In case no scheduling grant is received but the UE is to provide UL A/N, CSI and SR, the information is transmitted on the physical uplink control channel (PUCCH) according to a predefined format.

The processing time for UL RSIG generator, Block mapper, and SC-FDMA modulator is highly dependent on the bandwidth in use, whereas the processing time for Data encoder is depending on the UE category.

Further, due to timing advance (TA) and the standard stipulating that cell radius up to 100 km shall be supported, the uplink subframe n may have to be transmitted 0.67 ms before downlink subframe n has been received. Hence the UE will have to be able to do all data- and CSI-related processing of a subframe within roughly 2 ms, to meet the times for DL A/N, acting on aperiodic CSI reporting requests, acting on UL A/N from network node, etc.

It shall be noted that due to cost and power effectiveness a UE is generally designed with just the processing capacity, memory size, etc needed for the supported features and capabilities, e.g. number of DL and UL carriers, respectively, and supported bandwidth for each of them. This is reflected e.g. by that the FFTs and IFFTs are designed to meet the deadlines on OFDM symbol basis, but not much quicker.

Figure 8:
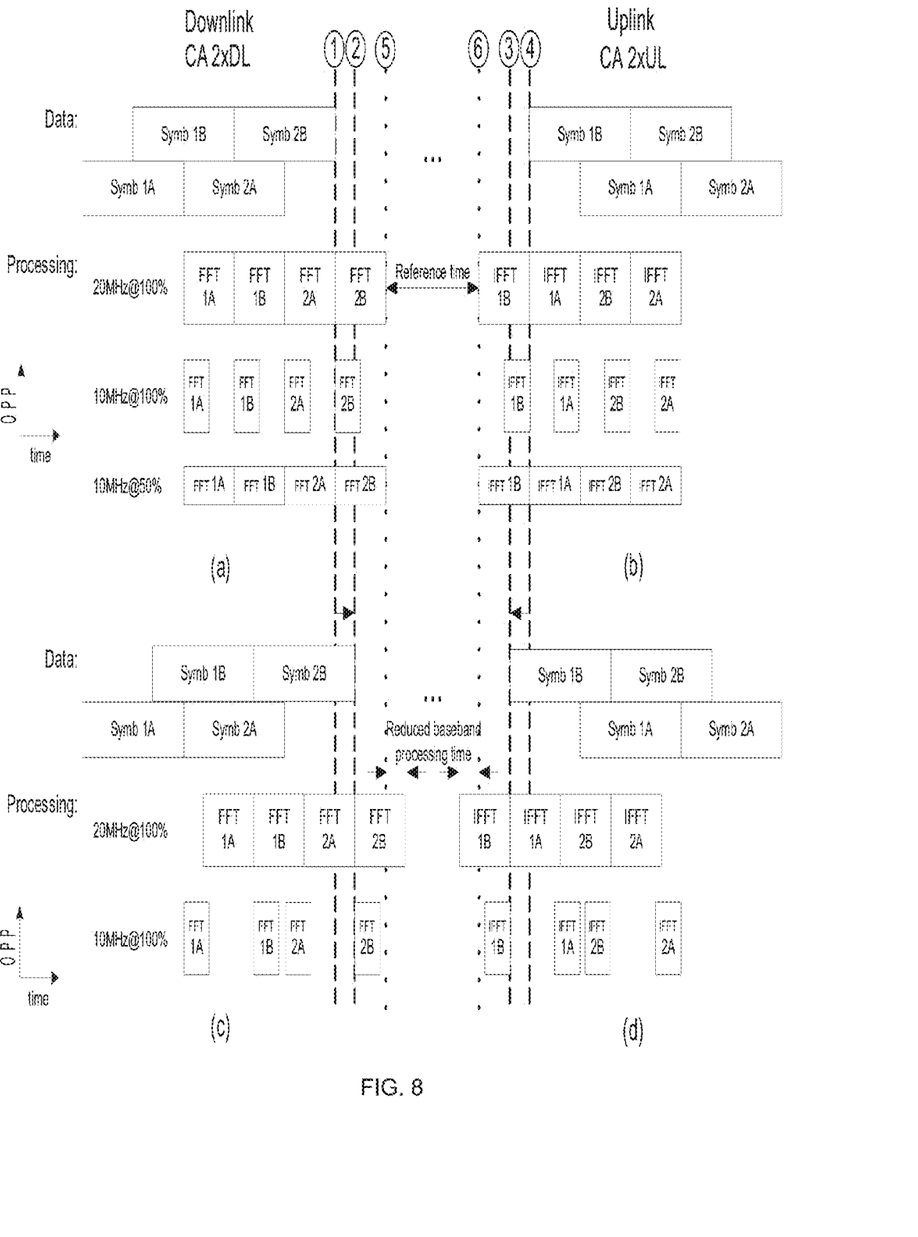
FIG. 8 schematically illustrates OFDM symbol demodulation and SC-FDMA symbol modulation in a UE where the UE is capable of 2×DL and 2×UL CA over 40 MHz.

UE—OFDM Symbol Demodulation and SC-FDMA Symbol Modulation in UE Capable of 2×DL and 2×UL CA Over 40 MHz Timing diagrams for a hypothetical UE supporting 2×DL and 2×UL CA, is illustrated in FIG. 8 for two consecutive OFDM symbols to receive and transmit.

FIG. 8, part a, shows the FFT processing when receiving OFDM symbols from carriers A and B, with PCell-to-SCell time difference of less or equal to half an OFDM symbol. The FFT is run consecutively for the two carriers, and three examples are shown: running FFT on 20 MHz carriers at 100% clock frequency, and 10 MHz carriers at 100% and 50% clock frequency, respectively. The reason for reducing the clock frequency is to lower the power consumption by selecting what is referred to as a lower operating performance point (OPP). As shown, the delay between the carriers is not an issue since for instance in the 20 MHz@100% and 10 MHz @50% cases the FFT is anyway busy with processing Symb 1A while Symb 1B is received.

FIG. 8, part b, shows the corresponding uplink processing, where the IFFT is run sequentially. The net time available for the time from reception to transmission of e.g. DL A/N is illustrated by lines 5 to 6. The time span represented by the lines 5 and 6 is immediately impacted by TA and particularly the difference in TA between carriers A and B.

FIG. 8, parts c and d, show what happens when the PCell-to-SCell time difference exceeds half an OFDM symbol, and the TA difference increases correspondingly, when running FFT and IFFT at 100% for carriers of 20 MHz and 10 MHz bandwidth, respectively. Since the FFT has to be utilized 100% this additional delay between the carriers causes a delay in all FFT processing when the carriers have 20 MHz bandwidth. The situation is similar on the uplink. This causes a reduction of the available processing time for the rest of the baseband corresponding to the time spans between lines 1 and 2, and 3 and 4, respectively. For carriers of 10 MHz bandwidth there will not be any reduction in the processing time, but due to the jitter caused in the FFT processing by the additional delay it is not feasible to select an OPP corresponding to 50%. Hence more power is consumed.

A UE designed according to minimum requirements on max supported PCell-to-SCell time difference, and maximum TA difference, will when supporting the maximum aggregation bandwidth (20 MHz carriers) get less time e.g. for Turbo decoding (fewer iterations) and thus will display a reduction in performance. On the other hand, when less than the maximum aggregation bandwidth is supported, it may still be possible for the UE to support a larger PCell-to-SCell time difference and TA than minimum requirements.

Figure 9:
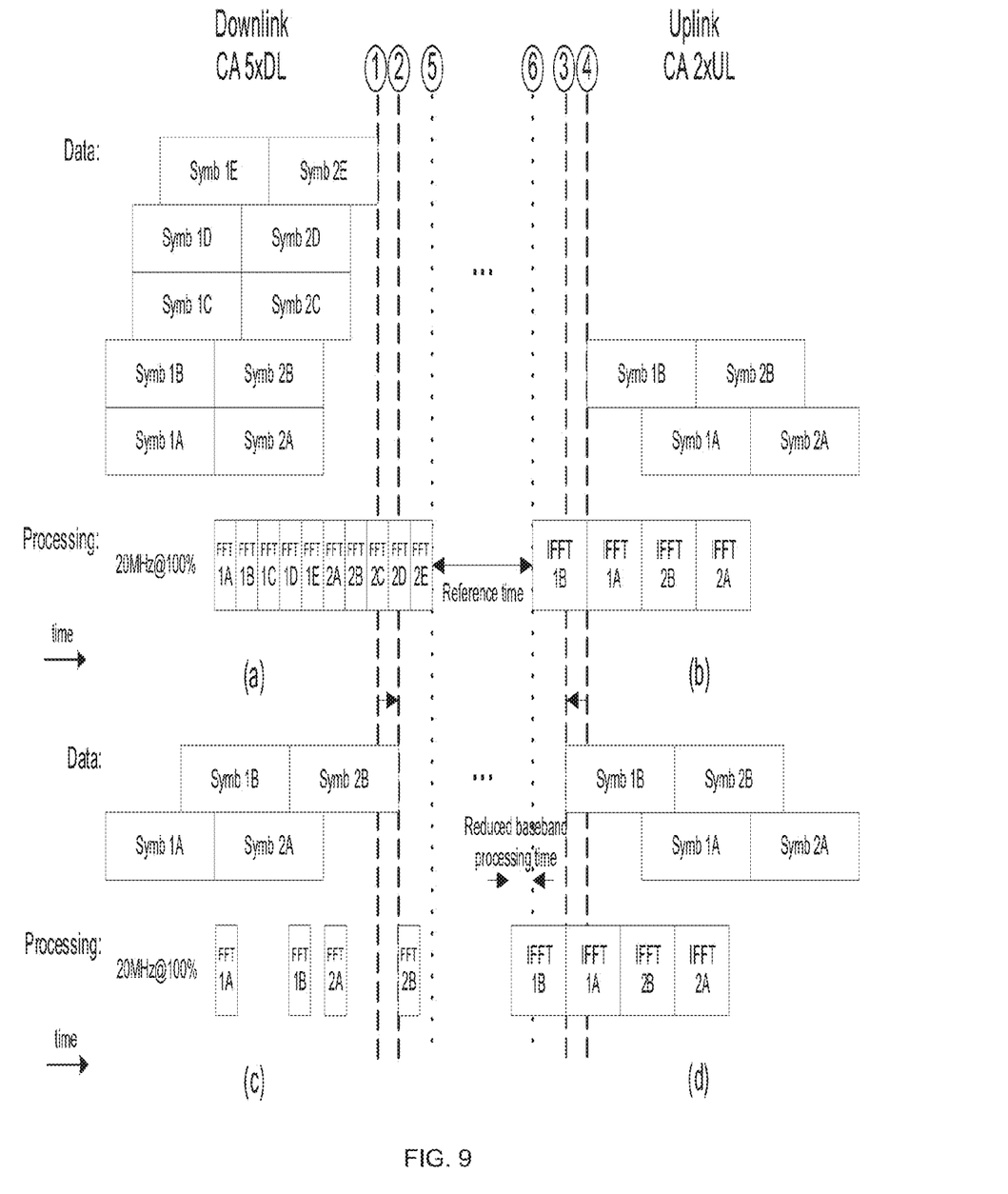
FIG. 9 schematically illustrates OFDM symbol demodulation and SC-FDMA symbol modulation in a UE where the UE is capable of 5×DL and 2×UL CA over 100 and 40 MHz, respectively.

UE—OFDM Symbol Demodulation and SC-FDMA Symbol Modulation in UE Capable of 5×DL and 2×UL Over 100 and 40 MHz, Respectively Another example of a hypothetical UE implementation supporting 5×DL and 2×UL CA is shown in FIG. 9. FIG. 9, parts a and b, show the timeline for FFT and IFFT when processing 5 DL carriers and 2 UL carriers sequentially, where the maximum PCell-to-SCell time difference, and TAG difference, both are within half an OFDM symbol. This gives the available time for other processing as indicated by the span between lines 5 and 6.

FIG. 9, parts c and d, show a corresponding timeline when only two out of five carriers are aggregated on the downlink, but full capacity is utilized on the uplink. Carrier B is offset to Carrier A by more than half an OFDM symbol, but since not full capacity is utilized on the downlink, it does not cause the downlink processing to introduce more delays than before. Additionally there is less subsequent processing to do due to fewer carriers. On the uplink the increase TA difference between Carrier B and Carrier A leads to that the IFFT has to be prepared earlier, meaning e.g. that more data needs to be buffered before being sent to the radio. Depending on the particular UE design this might be a limiting factor.

The essence of the examples is that a UE designed to meet the minimum requirements according to its capabilities may be able to handle more than the minimum requirements when not configured up to its capacity. If aggregating fewer carriers than designed for, or the cells are using less than the maximum bandwidth (20 MHz) on some or all of the carriers, it may be possible to support larger time difference between the cells on downlink, uplink, or both. In the end it depends on the UE implementation whether e.g. larger time difference can be traded for more buffering. Hence capability to go beyond the minimum requirements on maximum supported PCell-to-SCell time difference and TAG time difference is individual down to UE model and configuration, and may change dynamically depending on how many carriers are used, how wide the aggregated bandwidth is, and what other functionality is requested from the UE at that time.

Figure 10:
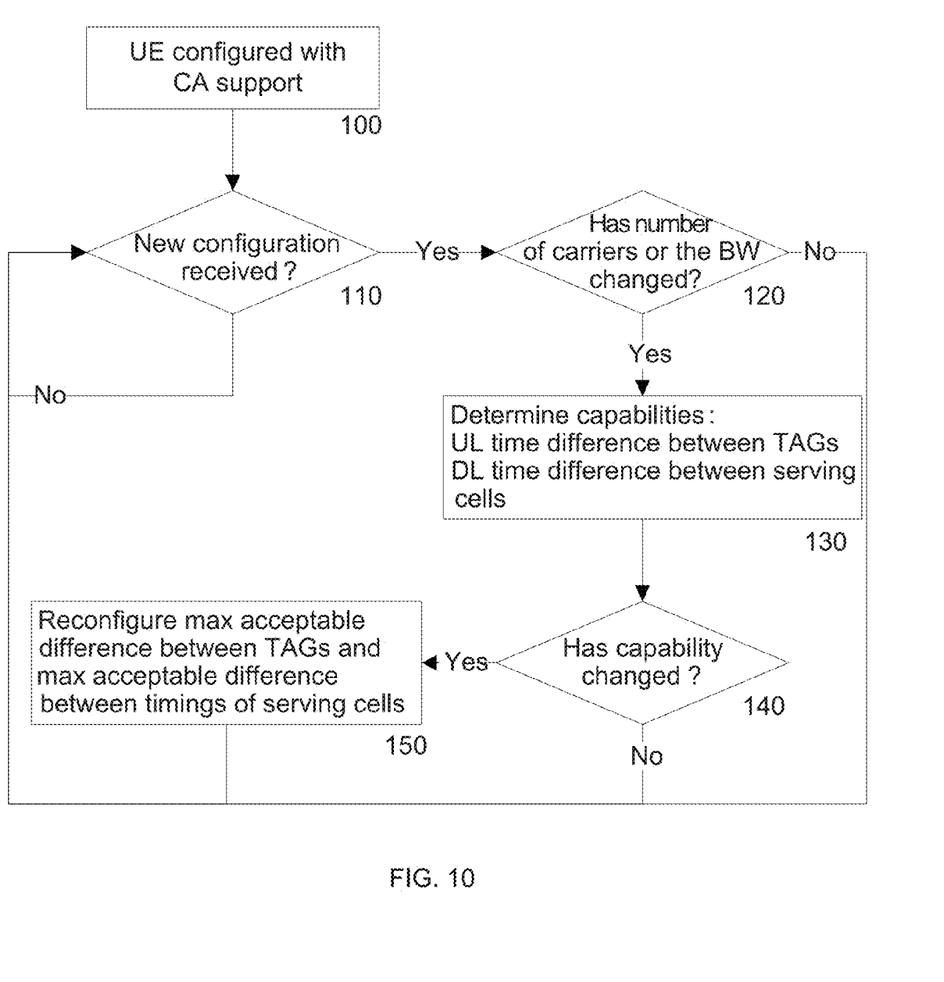
FIGS. 10 to 13 are flow charts illustrating methods according to embodiments.

UE—Determining the Capability for Serving Cell Time Difference and TAG Time Difference Upon Reconfiguration FIG. 10 is a flow chart illustrating an approach according to an embodiment. The UE is configured to support CA 100 and receives a new configuration such as addition and/or release of SCells 110; YES. It checks whether the number of aggregated carriers has changed, and if so 120; YES, it determines applicable capabilities with respect to time difference between TAGs, and maximum time difference between serving cells 130. In case the capabilities have changed from the previously determined ones 140; YES, it reconfigures the baseband to support time difference between TAGs and between serving cells according to the new capabilities.

Influential factors when determining capabilities include but are not limited to:

Embodiment 1

UE Determining its Capabilities Upon Reconfiguration

The UE is configured to support CA (100) and receives a new configuration such as addition and/or release of SCells (110; YES). It checks whether the number of aggregated carriers has changed, and if so (120; YES), it determines applicable capabilities with respect to time difference between TAGs, and maximum time difference between serving cells (130). In case the capabilities have changed from the previously determined ones (140; YES), it reconfigures the baseband to support time difference between TAGs and between serving cells according to the new capabilities.

Influential factors when determining capabilities include but are not limited to:
Number of DL carriers vs maximum capacity
Number of UL carriers vs maximum capacity Bandwidth of any or all of the DL carriers Bandwidth of any or all of the UL carriers Hence the capability can be expected to change when number of carriers and/or aggregation bandwidth changes (aka bandwidth combination set for CA e.g. 10 MHz and 5 MHz for the serving cells). Moreover the capabilities may be different on uplink and downlink.

The capabilities of the UE may be stored in a table (e.g Table 1) which may for example show the tolerable delay for different combinations of the number of carriers and the bandwidth being used.

TABLE 1

| | Aggregation BW: | | |
|---|---|---|---|
| | 20 MHz | 30 MHz | 40 MHz ... |
| 1 carrier | +−X us | ... | |
| 2 carriers | +−Y us | | |
| 3 carriers | ... | | |
| ... | | | |

The capabilities may be also be obtained using an algorithm essentially taking the same aspects (number of carriers and bandwidth) into account but calculating how much can be tolerated e.g. by using FFT processing times for different bandwidths.

UE—Monitoring and Acting Upon Changes in Time Difference Between TAGs

Figure 11:
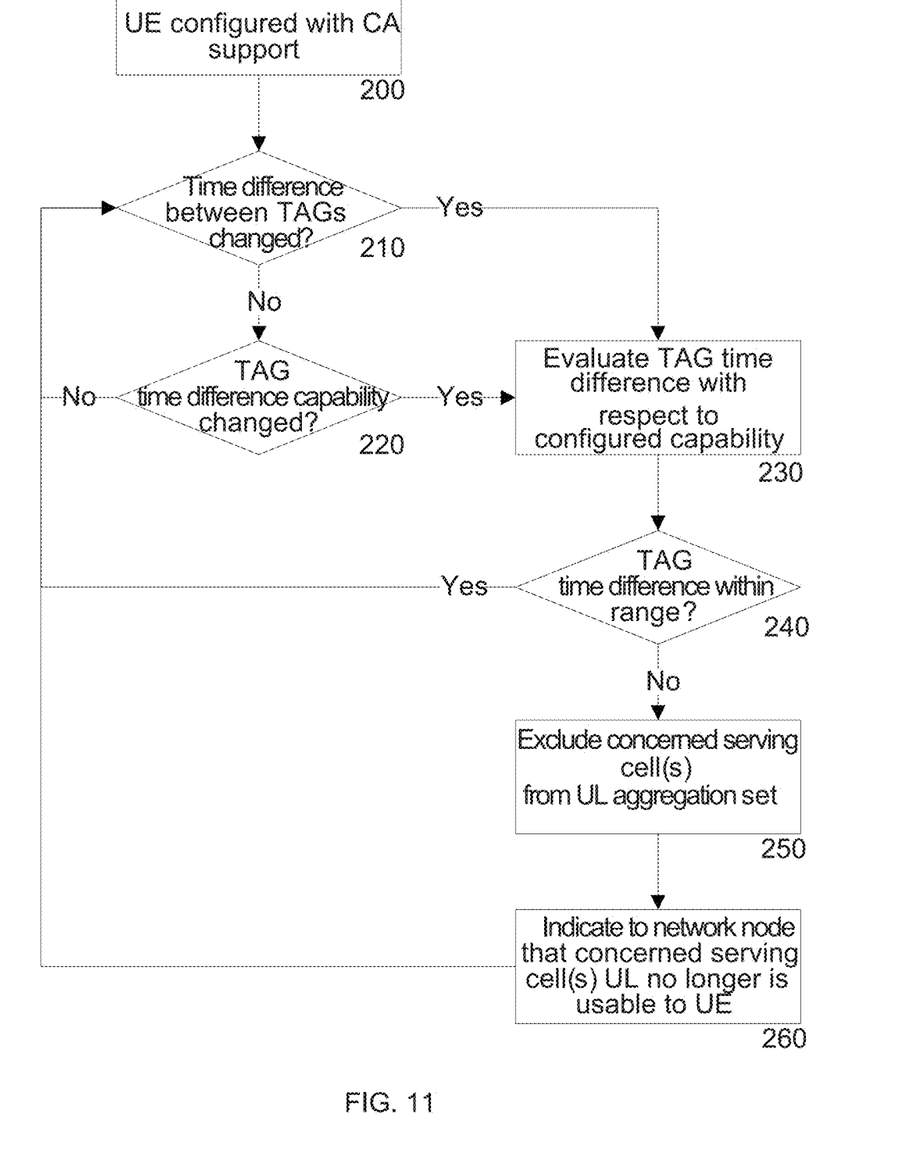

FIG. 11 is a flow chart illustrating an approach according to an embodiment. The UE is configured to support CA 200 and monitors the time difference between the TAGs. In case it changes 210; YES, it evaluates whether it exceeds the configured maximum time difference 230. If so 240; YES, it excludes the concerned serving cell(s) (e.g. SCell(s)) from the UL aggregation set (stops acting on scheduling grants 250, and indicates to the network node that the serving cell no longer can be used by the UE for UL CA 260. One possibility is that the UE signals the indication to the NW using an Radio Resource Configuration, RRC, message. Another possibility is that the UE signals the indication to the NW using a Medium Access Control, MAC, message. The benefit of using MAC messages is that they can potentially be signaled faster than an RRC message.

In one alternative of this embodiment the UE will determine for which serving cells, and/or which TAGs, the time difference exceeds the configured maximum time difference and report these serving cells, and/or TAGs. For example, if the UE is configured with three cells, Cell 1, Cell 2 and Cell 3, where the time difference between Cell 1 and Cell 2 is T1, the time difference between Cell 1 and Cell 3 is T2 and the time difference between Cell 2 and Cell 3 is T3. In case the time T2 exceeds the configured maximum time difference, while T1 and T3 does not, then the UE would exclude Cell 1 and Cell 3 from the aggregation set as indicated above, and possibly also indicate that Cell 1 and Cell 3 no longer can be used by the UE for UL CA. Alternatively the UE would in this scenario only exclude one of Cell 1 and Cell 3, and then only indicate that the excluded serving cell no longer can be used by the UE for UL CA.

In case the TAG capability has changed 220; YES, the UE evaluates whether the current TAG time difference is within range given the new capability 230, and essentially follows the same flow as above.

Figure 12:
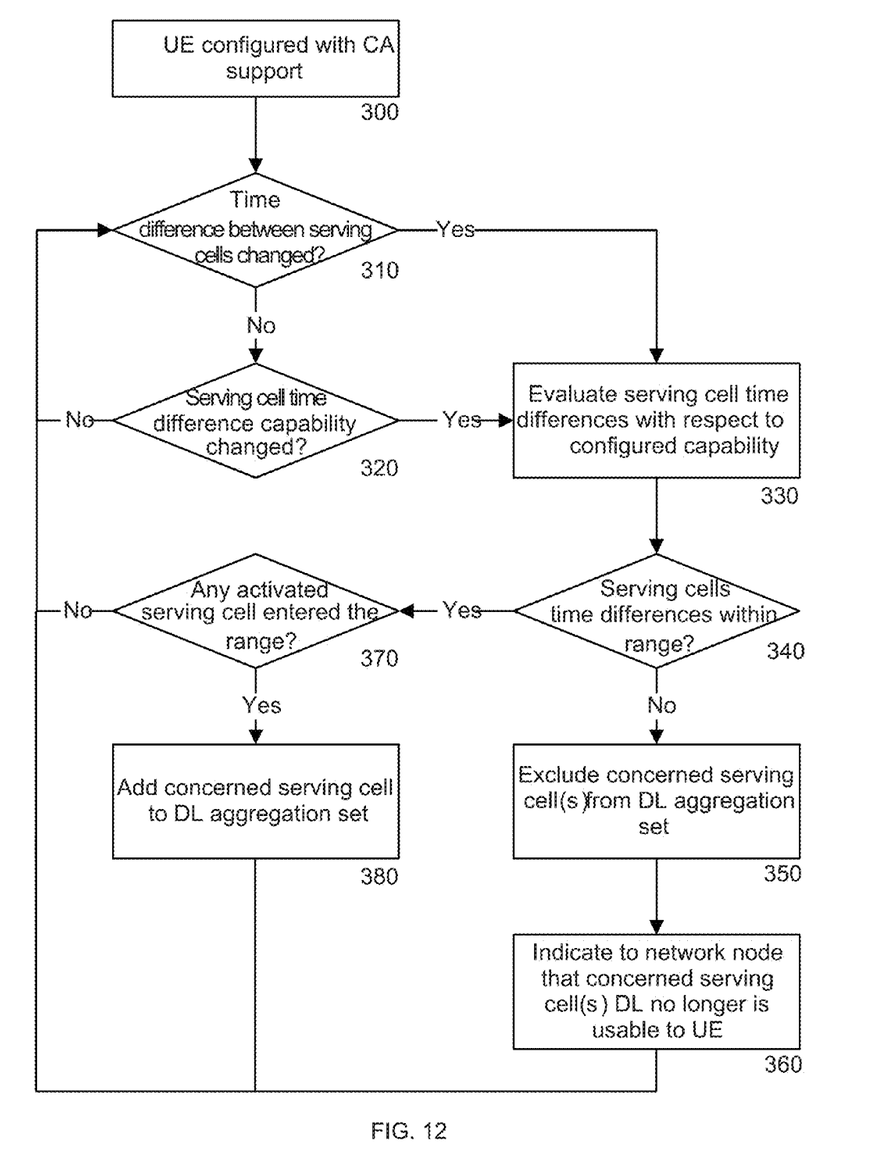

UE—Monitoring and Acting Upon Changes in Maximum Time Difference Between Serving Cells FIG. 12 is a flow chart illustrating an approach according to an embodiment. The UE is configured to support CA 300 and monitors the maximum time difference between any two cells. In case it changes 310; YES, the UE evaluates whether it is still within the supported range given the configured capability (330). If it is outside the supported range 340; YES, the UE excludes the concerned serving cell(s) from the aggregation set 350, and indicates to the network that it no longer can be used by the UE for DL CA 360.

In case the maximum time difference capability has changed 320; YES, the UE evaluates whether the current time difference is within range given the new capability 330, and essentially follows the same flow as above.

Should the UE find that the time difference is within the range 340; YES, and further find that a serving cell has been activated and is within range 370; YES, it adds it to the DL aggregation set 380.

Network Node—Acting on Indications from the UE

Figure 13:
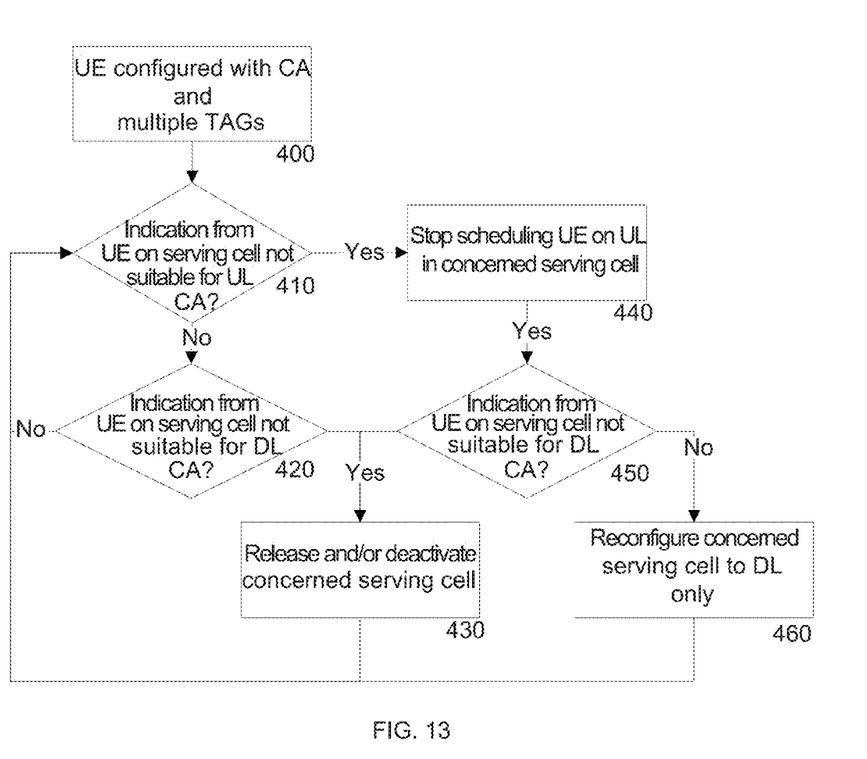

FIG. 13 is a flow chart illustrating an approach according to an embodiment. The network node has configured the UE to support CA with multiple TAGs 400. It monitors whether any indications are received from the UE on whether any serving cell becomes unsuitable for UL 410 and/or DL 420 CA operation. If a serving cell becomes unsuitable for UL aggregation 410; YES, the network node stops scheduling the UE on UL in the concerned serving cell 440. If the UE simultaneously has indicated the serving cell has become unsuitable for DL aggregation 450; YES, it sends a radio resource reconfiguration message to the UE to release (sometimes referred to as deconfigure) and/or deactivate the concerned serving cell 430.

In case the UE only has indicated a serving cell to be unsuitable for UL, and not for DL 450; NO, the network node sends a radio resource reconfiguration message to the UE to reconfigure the serving cell from being used in both UL and DL CA to only be used in DL CA.

In case the network node has received an indication on a serving cell is unsuitable to use for DL CA operation, it sends a radio resource reconfiguration message to release the serving cell, or an MAC message to deactivate the serving cell, regardless of whether the UE still is capable of using it for UL CA operation. This since if the UE is not tracking the serving cell closely on the DL it cannot guarantee that the transmit timing requirements on the uplink are fulfilled (see 3GPP TS 36.133 V12.3.0 section 7.1).

Further Notes, Definitions and Examples

One or more events may be introduced to allow the UE to report when a serving cell becomes unsuitable for UL CA, DL CA, or both.

Optionally, the UE may further take battery status into account when determining capabilities since in some scenarios an extended range will lead to missed opportunities to run the baseband processing in a more power-conserving mode by selecting a lower OPP. Hence if the battery is weak, say under 30%, the UE may choose to support only the minimum requirements on maximum time difference between PCell and SCells, and on maximum time difference between TAGs.

Examples of pre-defined rules are:

If the UE cannot transmit on UL SCell when the transmit time difference between TAGs exceeds the UE capability then the UE shall send the CSI (e.g. CQI, PMI, RI etc) for the DL SCell on the available UL serving cell (e.g. PCell or on any available UL SCell).

If the UE cannot transmit on UL SCell when the transmit time difference between TAGs exceeds the UE capability then the UE shall send the CSI for the DL SCell on a particular UL channel (e.g. PUCCH, PUSCH etc) on the available UL serving cell (e.g. PCell or on any available UL SCell).

The above rule will also enable the network node (e.g. eNB) to implicitly detect that the UE has stopped transmission on the UL SCell e.g. because transmit time difference between TAGs is larger than a threshold (i.e. UE capability).

Every UE may not have the capability of rerouting the CSI reports for DL SCell due to corresponding unsuitable UL SCell. Therefore UE may also signal its capability that it has the capability to send the CSI for a first DL SCell on any available UL serving cell in case the UE cannot send the CSI on UL SCell link to the first DL SCell. The network node (e.g. eNode B) uses this capability information to implicitly determine when the UE stops transmission on an unsuitable UL SCell.

Figures 14, 15:
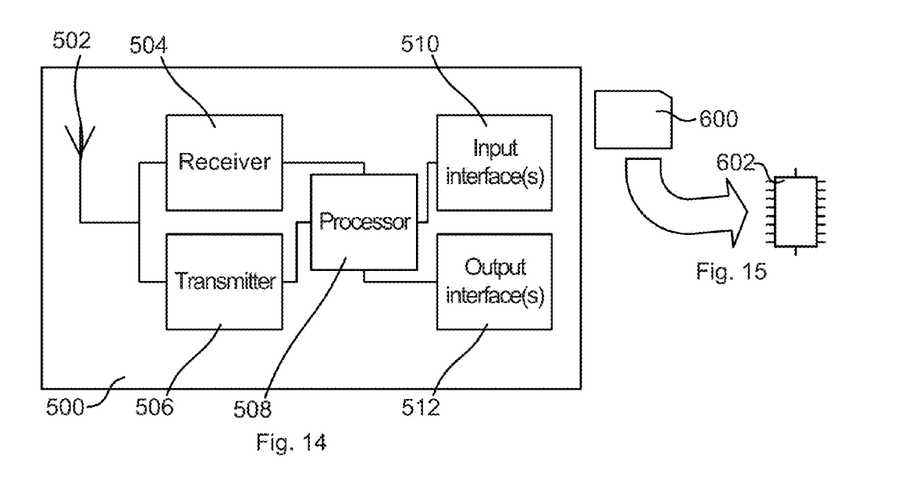
FIG. 14 is a block diagram schematically illustrating a UE according to an embodiment.
FIG. 15 schematically illustrates a computer-readable medium and a processing device.

FIG. 14 is a block diagram schematically illustrating a UE 500 according to an embodiment. The UE comprises an antenna arrangement 502, a receiver 504 connected to the antenna arrangement 502, a transmitter 506 connected to the antenna arrangement 502, a processing element 508 which may comprise one or more circuits, one or more input interfaces 510 and one or more output interfaces 512. The interfaces 510, 512 can be user interfaces and/or signal interfaces, e.g. electrical or optical. The UE 500 is arranged to operate in a cellular communication network. In particular, by the processing element 508 being arranged to perform the embodiments demonstrated with reference to FIGS. 10 to 13, the UE 500 is enabled of determining its capabilities in handling time differences between TAGs, and adapt the operation of the UE accordingly, e.g. transmitting a message to a network node about the capabilities and/or operation. The processing element 508 can also fulfill a multitude of tasks, ranging from signal processing to enable reception and transmission since it is connected to the receiver 504 and transmitter 506, executing applications, controlling the interfaces 510, 512, etc.

The methods according to the present invention is suitable for implementation with aid of processing means, such as computers and/or processors, especially for the case where the processing element 508 demonstrated above comprises a processor handling capabilities for differences in TAG timing. Therefore, there is provided computer programs, comprising instructions arranged to cause the processing means, processor, or computer to perform the steps of any of the methods according to any of the embodiments described above, in particular with reference to FIG. 10 to 13. The computer programs preferably comprises program code which is stored on a computer readable medium 600, as illustrated in FIG. 15, which can be loaded and executed by a processing means, processor, or computer 602 to cause it to perform the methods, respectively, according to embodiments of the present invention, preferably as any of the embodiments described herein, e.g. with reference to FIGS. 10 to 13. The computer 602 and computer program product 600 can be arranged to execute the program code sequentially where actions of the any of the methods are performed stepwise. The processing means, processor, or computer 602 is preferably what normally is referred to as an embedded system. Thus, the depicted computer readable medium 600 and computer 602 in FIG. 15 should be construed to be for illustrative purposes only to provide understanding of the principle, and not to be construed as any direct illustration of the elements.

The examples above have been given mainly with reference to the context of LTE Advanced, for the sake of easier understanding, but the examples are equally applicable to any other communication system where timing advance needs to be handled towards multiple serving cells. It should also be noted that any of the optional considerations for determining capability of the communication device demonstrated above are equally applicable for any of the examples given with reference to FIGS. 10 to 13.

The invention claimed is:

1. A method of handling timing advance groups (TAGs) in a user equipment (UE) configured to support carrier aggregation (CA), the method comprising:
   determining a capability of the UE for supporting time differences between signals received from any two serving cells, wherein said determining is based on how many carriers are configured for CA and on an aggregated bandwidth for CA;
   monitoring time differences between signals received from any two serving cells;
   determining, for each time difference, whether the UE supports the time difference, based on the determined capability.

2. The method of claim 1, further comprising excluding a serving cell from a serving set if a time difference related to that serving cell is determined to be unsupported.

3. The method of claim 2, wherein that serving cell is comprised in a downlink (DL) aggregation set.

4. The method of claim 2, wherein that serving cell is comprised in an uplink (UL) aggregation set.

5. The method of claim 1, further comprising sending an indication to a network node that a serving cell is no longer usable to the UE if a time difference related to that serving cell is determined to be in supported.

6. The method of claim 1, wherein the monitoring is performed for each serving cell such that a maximum present time difference is determined.

7. A wireless telecommunication device arranged to operate in a wireless telecommunication network supporting carrier aggregation (CA), wherein the device is configured to support CA, the device comprising:
   a receiver; and
   one or more processing circuits configured to:
      determine a capability of the device for supporting time differences between signals received from any two serving cells, wherein said determining is based on how many carriers are configured for CA and on an aggregated bandwidth for CA;
      monitor time differences between signals received from any two serving cells; and
      determine, for each time difference, whether the device supports the time difference, based on the determined capability.

8. The device of claim 7, wherein the one or more processing circuits are further configured to exclude a serving cell from serving set if a time difference related to that cell is determined to be unsupported.

9. The device of claim 8, wherein that serving cell is comprised in a downlink (DL) aggregation set.

10. The device of claim 8, wherein that serving cell is comprised in an uplink (UL) aggregation set.

11. The device of claim 7, wherein the one or more processing circuits are further configured to send an indication to a network node that a serving cell is no longer usable to the UE if a time difference related to that cell is determined to be unsupported.

12. The device of claim 7, wherein the one or more processing circuits are configured to monitor time differences for each serving cell such that a maximum present time difference is determined.

13. A non-transitory computer-readable medium comprising, stored thereupon, a computer program comprising instructions that, when executed on a processor of a communication apparatus configured to support carrier aggregation (CA), causes the communication apparatus to perform the following:
    determine a capability of the communication apparatus for supporting time differences between signals received from any two serving cells, wherein said determining is based on how many carriers are configured for CA and on an aggregated bandwidth for CA;
    monitor time differences between signals received from any two serving cells; and
    determine, for each time difference, whether the communication apparatus supports the time difference, based on the determined capability.

* * * * *